Nov. 14, 1933.　　　S. D. BUTTERWORTH　　　1,934,697
CAR LOADING DEVICE
Filed Aug. 3, 1931
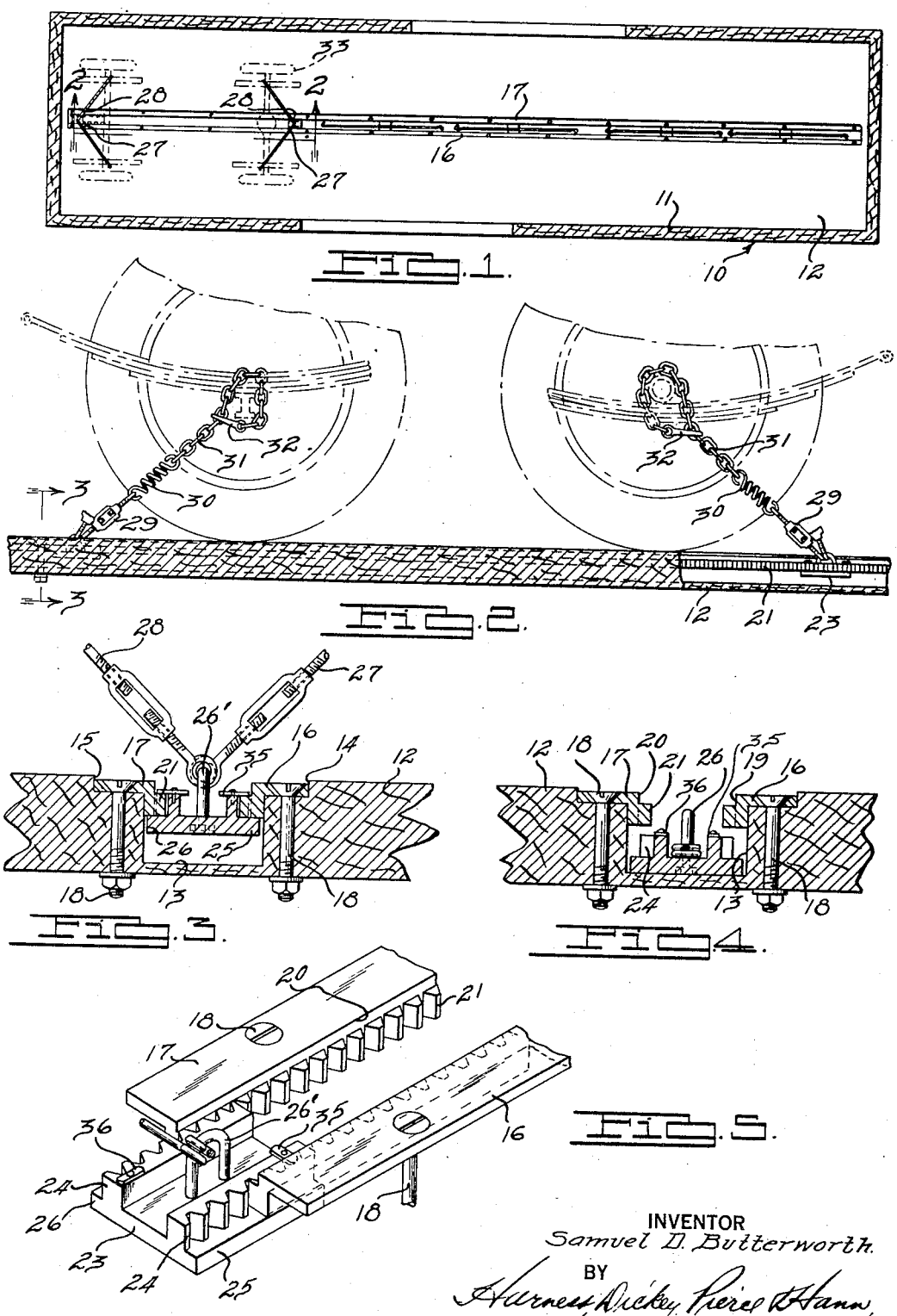
INVENTOR
Samuel D. Butterworth
BY
ATTORNEYS.

Patented Nov. 14, 1933

1,934,697

UNITED STATES PATENT OFFICE 1,934,697

CAR LOADING DEVICE

Samuel D. Butterworth, Detroit, Mich., assignor, by mesne assignments, to The Worth Company, a corporation of Michigan Application August 3, 1931. Serial No. 554,616

5 Claims. (Cl. 105—368)

The invention relates particularly to devices for securing motor vehicles in freight cars or the like for shipping purposes and the principal objects thereof are to provide improvements in such devices by means of which the vehicle or vehicles being transported in the freight car may readily and positively be secured against movement; to provide a device of this character which is disposed in a groove or guideway in the floor of the freight car, and which is of such character that it may be moved longitudinally of the groove to a desired position and then positively secured in such position merely by elevating the device in the groove during which elevating movement the device positively interlocks the side portions defining the groove; and to provide a device of this character which in its inoperative position, is housed by the groove from which it follows that it will not constitute an obstruction during ordinary use of the freight car.

For a complete understanding of the invention reference may be had to the accompanying drawing forming a part of the specification, wherein:

Figure 1 is a longitudinal, cross-sectional view of a freight car illustrating the application of the invention thereto;

Figure 2 is a fragmentary cross-sectional view on a larger scale, taken substantially along line 2—2 of Figure 1;

Figure 3 is a cross-sectional view on a larger scale, taken substantially along line 3—3 of Figure 2;

Figure 4 is a cross-sectional view similar to Figure 3, illustrating the device in its inoperative position in which it is housed by the groove in the floor of the freight car;

Figure 5 is a perspective view, illustrating the device shown by Figure 3, and the manner in which it is positively secured in an adjusted position in the groove.

Referring to Figure 1, a freight car is indicated at 10 having the usual side walls 11 and floor 12. As best shown by Figures 3 and 4, a groove or guideway 13 extending longitudinally and centrally of the car is formed in the floor, and at opposite sides of the groove, the floor is provided with longitudinally extending shallow recesses 14 and 15. Angle bars 16 and 17 have horizontal plate portions located in the recesses 14 and 15 which are secured to the floor by means of bolts 18 extending therethrough. Vertical legs 19 and 20 of the angle bars 16 and 17 respectively, project downwardly into the groove 13 at opposite sides of the latter, and adjacent vertical sides of such legs are provided with vertically extending rack teeth 21.

A block 23 slidably mounted in the groove 13 is provided with spaced sets of teeth 24 complementary to and adapted to cooperate with the teeth 21 on the angle bars 16 and 17, when the block is moved upwardly into its position shown by Figures 3 and 5. Upward movement of the block into this position is limited by projecting edge portions 25 and 26 at opposite sides of the block, which engage the lower edges of the vertical leg portions 19 and 20 of the angle bars. When the block is in its lowermost position and resting on the base of groove 13, the teeth 24 on the block are disposed below the teeth 21 on the angle bars, and consequently the block may be slidably moved along the base of the groove 13.

Intermediate the sets of teeth 24, the block 23 is provided with a U bolt 26' which serves to secure a pair of flexible connecting elements indicated at 27 and 28 in Figure 3, to the block. Each of the connecting elements as shown clearly by Figure 2, includes a turn buckle 29, a spring 30, a length of chain 31 and a hook 32 at the end of the chain. When a motor vehicle is to be secured to the floor of the freight car, it is disposed in the position indicated in broken lines 33 in Figure 1, and then two of the blocks 23 are moved along the groove 13 in the floor of the freight car until one of the blocks is disposed slightly forwardly of the front axle of the vehicle, while the other block is disposed slightly to the rear of the vehicle. The blocks are then secured in their adjusted positions by moving them vertically until the teeth 24 thereon engage the teeth 21 in the sides of the groove and then the blocks are retained in their elevated positions by means of small latch plates 35 and 36 shown best by Figures 3 and 5, which are pivoted on the upper surface of the tooth portions of the block and inwardly of the teeth. These latch plates when moved into one position, with the block engaging the teeth 21 in the groove, overlap the upper surfaces of certain of the teeth 21 and hence prevent downward movement of the block.

In securing the vehicle to the floor of the freight car, the connecting element 27 for example is slung around the junction of one of the side springs and the axle and then the hook is engaged with the chain 31 as indicated in Figure 2. The spring 30 provides a certain degree of resiliency in the connection which is desirable, while the turn buckle 29 is utilized for taking up any play in the connection when this is desired. As seen in Figure 1, the connecting elements 27 and 28 on the forward block engage opposite end portions of one axle, while the connections 27 and 28 on the rear block engage opposite end portions of the other axle. When the connections are not in use, they may be disposed longitudinally in the groove 13 in the floor of the freight car, as shown by Figures 1 and 4, and hence below the general surface of the freight car floor and out of the way. As a result, such devices may be disposed in their inoperative position in such manner that they will not interfere with ordinary use to which the freight is adapted.

It is apparent from the foregoing description that the blocks 23 may be readily moved longitudinally in the groove 13 in the floor of the freight car and secured in any adjusted position in a manner which positively prevents longitudinal movement of the blocks. Also the flexible connections 27 and 28 connected to each block provide a very efficient means for securing an axle of a motor vehicle to the floor of the freight car and by disposing one block forwardly of one axle and the other block rearwardly of the other axle both forward and rearward movement of the vehicle is prevented. Also it is apparent that directing the connections 27 and 28 on each block toward opposite ends of the axle respectively, prevents lateral movement of the vehicle. Securing devices constructed according to the previous description are inexpensive, easily manipulated, positive in operation, and of such character that they may be disposed in non-interfering positions when the freight car is subjected to ordinary use.

Although only one form of the invention has been described and illustrated in detail, it will be apparent to those skilled in the art that various modifications may be made without departing from the scope of the appended claims.

I claim:

1. In combination, a freight car floor or the like having a guideway therein, metal bars at opposite sides of the guideway provided with vertically directed rack teeth, and an anchor block slidably mounted in the guideway and having rack teeth adapted to cooperate with the rack teeth on the metal bars when the block is moved in a vertical direction, whereby the block may be positively secured against longitudinal movement in either direction when the rack teeth are in engaging relation.

2. In combination, a freight car floor or the like having a guideway therein, an anchor block movable vertically and longitudinally in the guideway, means including vertically directed teeth and cooperating recesses on side walls of the block and guideway for locking the block against longitudinal movement in said guideway, and means for locking the block against upward movement when the teeth and recesses are cooperatively associated.

3. In combination, a freight car floor or the like, having a guideway therein of undercut character, vertically directed and longitudinally spaced teeth on one side wall of the guideway, and spaced from the bottom wall, an anchor block slidably mounted in the guideway and having teeth on one side thereof substantially complementary to the teeth on the side wall of the guideway when the block is moved upwardly, means for preventing further movement of the block upwardly after the teeth thereon are in engagement with the teeth on the guideway, and flexible elements connected to the block and adapted for engagement with opposite ends of a vehicle axle.

4. In combination, a freight car floor or the like having a guideway therein of undercut character, vertically directed and longitudinally spaced teeth on one side wall of the guideway, and spaced from the bottom wall, an anchor block slidably mounted in the guideway and having teeth on one side thereof substantially complementary to the teeth on the side wall of the guideway when the block is moved upwardly, means for preventing further movement of the block upwardly after the teeth thereon are in engagement with the teeth on the guideway, and chains connected to the block and adapted for engagement with opposite ends of an axle of a vehicle, said guideway being of such character, that the chains may be disposed therein and below the surface of the floor when not in use.

5. In combination, a freight car floor or the like having a guideway therein, vertically directed and longitudinally spaced teeth on opposite sides of the guideway, and spaced from the bottom thereof, an anchor block slidably mounted in the guideway for movement longitudinally therein when in a lower position in such guideway, and having teeth on opposite sides thereof for cooperating with the teeth at the sides of the guideway when the block is moved upwardly, means for preventing further movement of the block upwardly after the teeth thereon are in engagement with the teeth in the guideway, and means connected to the block for securing a vehicle or the like in the freight car.

SAMUEL D. BUTTERWORTH.